April 23, 1963     G. S. CLAYSON     3,086,603
ANALYTICAL BALANCES

Filed Sept. 22, 1958     3 Sheets-Sheet 1

INVENTOR.
GORDON S. CLAYSON
BY
*Horace B. Van Valkenburgh*
ATTORNEY

INVENTOR.
GORDON S. CLAYSON
BY
Horace B. Van Valkenburgh
ATTORNEY

April 23, 1963

G. S. CLAYSON 3,086,603

ANALYTICAL BALANCES

Filed Sept. 22, 1958

INVENTOR.
GORDON S. CLAYSON
BY
Horace B. Van Valkenburgh
ATTORNEY

United States Patent Office 3,086,603
Patented Apr. 23, 1963

3,086,603
ANALYTICAL BALANCES
Gordon S. Clayson, 2151 Lawrence St., Denver, Colo.
Filed Sept. 22, 1958, Ser. No. 762,647
8 Claims. (Cl. 177—4)

This invention relates generally to weighing apparatus and more particularly to an automatic analytical balance.

Previous attempts to produce an automatic analytical balance, none of which have been completely satisfactory, have included limit switches operated by beam displacement, which require an electrical connection to the beam, and a plunger suspended by the beam and movable in a magnetic coil, which is adversely affected by nearly magnetic fields or materials, or residual magnetism in the system. A variation in electrostatic capacity between an electrode connected to the beam and a stationary electrode, together with a motor drive to restore the balance beam to neutral position, has also been used, but the accuracy of electrodes depending upon electrostatic capacity is adversely affected by temperature or barometric changes, while a motor drive to restore the balance beam to neutral position seriously affects the accuracy of the beam itself. Another of such devices involved a capacitance bridge and a complicated vacuum tube circuit associated therewith, but the accuracy and precision of such a balance is adversely affected by tube characteristic variations and the capacitance bridge is adversely affected by temperature and barometric changes.

Among the objects of the present invention are to provide an improved automatic balance; to provide such a balance which will weigh unknown loads with a high degree of precision and in a minimum of time; to provide such a balance which will detect load changes continually for periods of hours, days or even weeks; to provide such a balance which avoids the use of a restoring force other than provided by weights and the like; to provide an automatic balance, the accuracy and precision of which are not adversely affected by variations in line voltage, tube characteristic variations, temperature or barometric changes, passage of time, nearby magnetic fields or materials, or residual magnetism in the associated system; to provide an improved displacement detector operable to translate deflection of a balance beam from gravitational equilibrium into an electrical signal having a magnitude proportional to the displacement of the beam and a polarity dependent upon the direction of movement of the beam about its support; to provide such a balance which requires no electrical connection to the beam or other moving part; to provide a novel detector device for translating the movement of a balance beam into electrical signals proportional thereto which are free from error due to mechanical friction; to provide a balance system which includes such a balance and a recorder which provides a graphic recording of the weighing operation; to provide a balance system which automatically and substantially instantaneously records the weight changes of a load in the form of a weight change versus time curve; and to provide such a balance and balance system which will operate effectively and efficiently.

In accordance with the present invention, an automatic balance includes, in combination, stationary and movable portions of the balance, an inductance sensitive transducer means mounted on the stationary portion of the balance and adapted to be connected in a signal producing circuit, such as a bridge circuit, and means operatively connected to a movable weight responsive portion of the balance, adapted to vary the inductance of the transducer coil means to produce an unbalance in the bridge circuit and an electrical output therefrom proportional to the amount and direction of movement of the movable portion of the balance.

Additional objects of the present invention, together with the novel features thereof, will be apparent from the following description, taken in connection with the accompanying drawings, in which.

Figure 1:
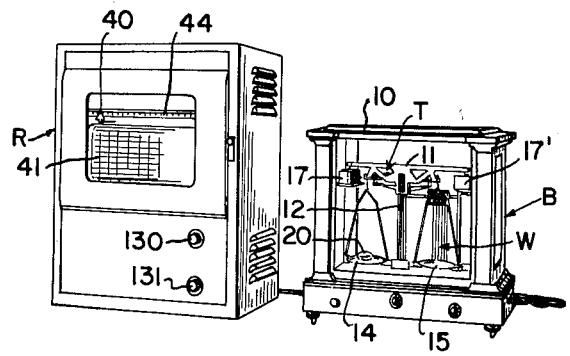
FIG. 1 is a front elevation of a balance and recorder constructed in accordance with this invention.

This invention is shown for purposes of illustration as applied to weighing apparatus of the type known as analytical balances, although it will be evident that it may be applied to other types of weighing apparatus. Thus, an analytical balance B and recorder R of FIG. 1 incorporate an automatic sensing and recording arrangement in accordance with this invention. The balance B may be the "Ainsworth" type BR analytical balance, while the recorder R may be an "Ainsworth" type AU–1 recorder. The balance B may include a conventional transparent case 10 which encloses the operating parts and protects the same from air currents and the like, such parts including a beam 11 pivoted on an upright beam support 12, as by a knife edge bearing 13 of FIGS. 2–4. Pans 14 and 15 may be suspended from opposite ends of the beam, as from knife edge bearings 16 of FIGS. 2–4, while an extension of each end of the beam B, as in FIG. 1, may be connected to the piston of the respective air dash pot 17 or 17' for damping purposes. Although a weight 18 is shown on pan 14 and an object 19 to be weighed on pan 15 in FIG. 2, it will be understood that the object to be weighed may be placed on pan 14, such as a quantity of evaporating liquid in a watch glass 20 of FIG. 1, while a series of weights may be placed automatically on pan 15, as by an automatic weight applying mechanism W, which may be operated by suitable mechanism in the base of case 10.

Figure 2:
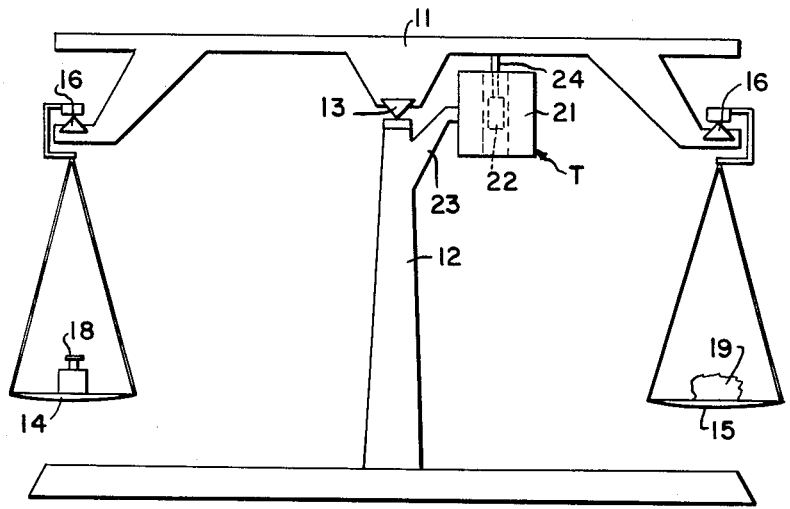
FIG. 2 is a front elevation of the operating elements of a beam balance showing the mounting of a transducer coil and probe.
Figure 3:
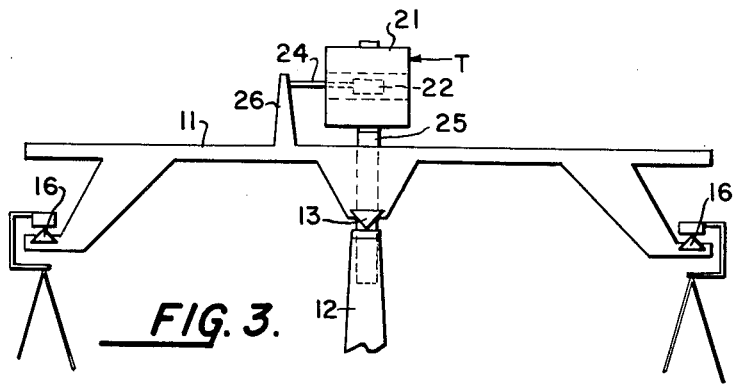
FIG. 3 is a fragmentary front elevation, otherwise similar to FIG. 2, showing an alternative mounting of the transducer coil and probe.
Figure 4:
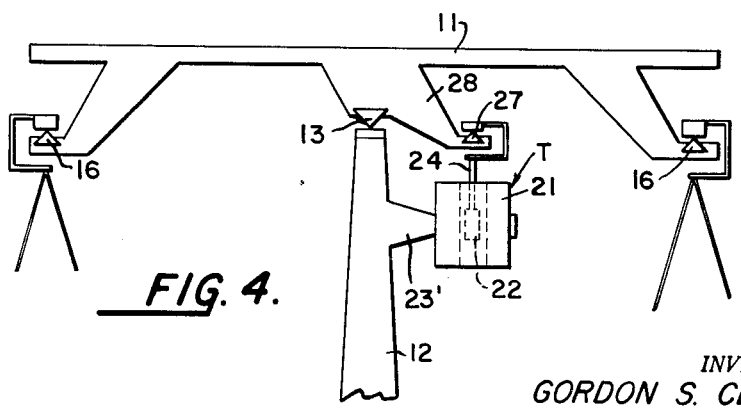
FIG. 4 is a view similar to FIG. 3, showing a further alternative mounting of the transducer coil and probe.

In accordance with this invention, a transducer T, as in FIG. 1, is associated with the beam 11 and a stationary part of the balance, such as beam support 12, the transducer T being adapted to be mounted in several alternative ways, such as illustrated in FIGS. 2–4. The transducer T includes a coil spool 21 and a probe 22, the latter being moved by the beam but requiring no electrical connection and also being free of engagement with the coil spool 21 during movement, thereby introducing no frictional resistance to movement of the beam through movement of the probe or resistance to movement of the beam by virtue of an electrical connection thereto.

The transducer T of FIG. 1 may be mounted in a manner similar to that shown in FIG. 2, in which the coil spool 21 is mounted in fixed position with its axis vertical on a bracket 23 extending laterally from support 12, while probe 22 is attached in a fixed position depending from beam 11, as by a rod 24. As will be evident, probe 22 will move upwardly or downwardly in accordance with deflection of beam 11 and generally axially within coil spool 21, the inner diameter of the latter being such that probe 22 will not engage the inside of spool 21 during such movement. The transducer T may, if desired, be mounted in the manner shown in FIG. 3, in which coil spool 21 is mounted on an upwardly extending extension 25 of support 12 with its axis horizontal, while probe 22 is mounted for horizontal movement within the coil, as by rod 24 being mounted in fixed horizontal position on a bracket 26 extending upwardly from beam 11, so that probe 22 will move in a horizontal direction within coil spool 21 upon deflection of beam 11. Transducer T may, if desired, be mounted in the manner shown in FIG. 4, in which coil spool 21 is mounted in a manner similar to FIG. 2, i.e., on a bracket 23' extending laterally from support 12, while probe 22 is again mounted for vertical movement but suspended from a knife edge bearing 27 mounted on a bracket 28 extending downwardly and angularly from beam 11, so that probe 22 will be maintained in vertical axial alignment with the coil spool 21 at all times.

Figures 5, 6:
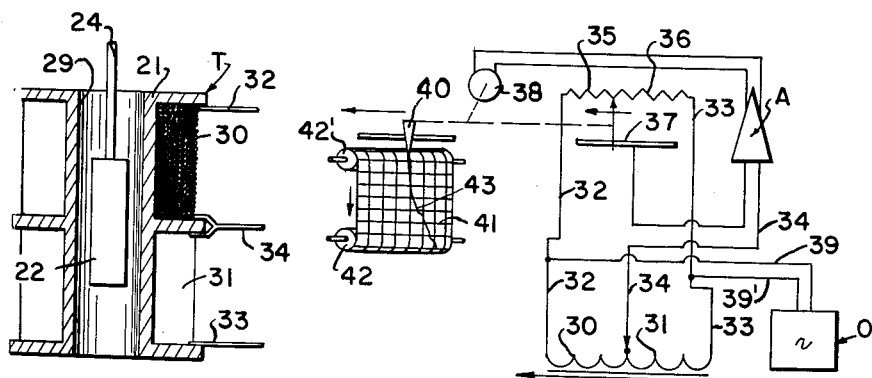
FIG. 5 is a longitudinal section, on an enlarged scale, of the transducer coil of FIGS. 2–4 showing also one position of the probe therein.
FIG. 6 is a diagrammatic representation of a number of the elements of a preferred form of this invention.

The transducer T may be constructed generally as in FIG. 5, coil spool 21 being formed of non-magnetic material and provided with a bore 29 and a pair of axially spaced cylindrical spaces which receive two symmetrical windings 30 and 31 in series from leads 32 and 33 and tapped between at a lead 34. Probe 22 is formed of a material having a high permeability and is positioned within bore 29, but is always out of contact with the walls thereof. Such a transducer is a variable permeance type, which in contrast to the variable reluctance devices, does not employ E-cores or other static flux-conducting components and does not set up a high flux density at any point. A variable permeance transducer has a minimum contrast in flux density over its operational range, which results in a high degree of linearity without need of correction factors.

In the diagram of FIG. 6, there are shown the desirable units to provide automatic operation of the balance. Transducer coils 30 and 31, as shown, comprise two legs of a bridge circuit with the resistance portions 35 and 36 of a slide-wire potentiometer 37 forming the other two legs of the bridge, leads 32 and 33 from the outer ends of coils 30 and 31 being connected respectively to the opposite ends of the resistances 35 and 36. Lead 34 from the common connection between coils 30 and 31 is connected to one input terminal of an amplifier A, while the slide-wire of potentiometer 37 is connected to the other input terminal of amplifier A, the output of which feeds a servomotor 38, which controls the position of slide wire potentiometer 37. The bridge circuit comprising coils 30 and 31 and resistances 35 and 36 is energized by means of an oscillator O which generates a high frequency alternating current. The high frequency signal from oscillator O is fed into the bridge by wires 39 and 39' at leads 32 and 33, i.e., between coils 30 and 31 and resistances 35 and 36, respectively. When probe 22 is moved within the transducer coils, as a result of deflection, the inductance of one coil 30 or 31 increases as the other decreases, producing an unbalanced condition in the bridge circuit and a bridge output signal to appear at lead 34, i.e., between the common connection of coils 30 and 31 and the slide-wire of bridge balance potentiometer 37. Different potentials will be present at these points, having a phase dependent upon the direction of movement of probe 22 and its position with respect to the previous null or zero point established by the bridge balance. The output from the bridge, when the probe is moved in one direction with respect to a null point, will be 180° out of phase with the output when probe 22 is moved in the opposite direction.

The output signal from the bridge, when balance beam 11 is displaced causing movement of probe 22 within the transducer coils, is amplified by amplifier A and energizes servomotor 38, which being connected to move the slide-wire of potentiometer 37 repositions the slide wire to produce a change in the relative resistance of the resistance portions 35 and 36 to reestablish a balanced condition in the bridge. When the bridge is in balanced condition, no output is supplied to amplifier A and servomotor 38 ceases to be energized. The servomotor is also connected to a writing pen and indicator 40 of recorder R, in effect a recording oscillograph, and causes the pen to be moved across a paper chart 41, which may be moved lengthwise under the pen, such as at a constant speed, by rollers 42 and 42' powered by a conventional motor and gear train (not shown). As the chart is moved and the slide wire and pen are repositioned to produce a balanced condition, a trace 43 is made on the chart by the pen, indicating the amount of repositioning that took place during the time required for a predetermined length of chart to pass under the pen. Thus, each time probe 22 is moved by the deflection of beam 11, the slide wire is repositioned and the movement is recorded on chart 41 by pen 40. As will be evident, when the chart is moved, the trace 43 will indicate the loss or gain in weight of the object. The weight change may also be observed through a scale 44 of FIG. 1. If the object being weighed is a liquid in the watch crystal 30 of FIG. 1, then the loss by weight as by evaporation, will be indicated on the chart by the trace 43. Or, a sample may be weighed periodically while undergoing an oxidation reaction, or subjected to corrosion, so that the trace 43 will indicate the gain or loss of weight at such time. Or, a sample may be heated to different temperatures and the result recorded by the trace 43. Again, a series of samples may be weighed, with the chart moved to a different position for each sample, so that the trace 43 will combine a permanent record of the weights of the samples. The latter is particularly advantageous in many instances, as for control purposes in a plant. Thus, the present invention is of particular advantage whenever weight vs. time, weight vs. temperature, or the like, is significant. When the object being weighed is being heated or undergoing corrosion, a conventional extension of a pan support may extend through the bottom or the top of housing 10 and into an insulated furnace, as for heating or oxidation, so that the balance will not be subjected to furnace temperatures.

Figure 7:
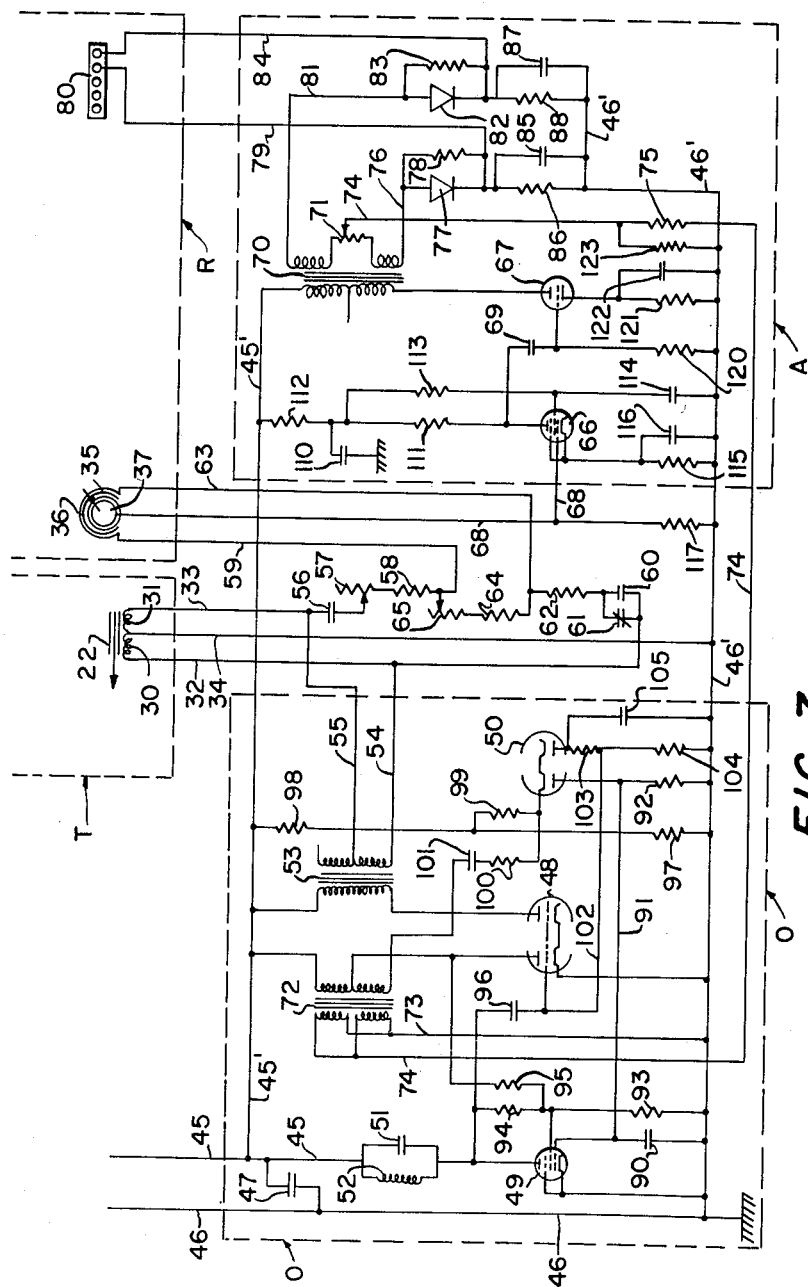
FIG. 7 is a circuit diagram of the electrical parts of a preferred form of this invention.

In the more complete circuit shown in FIG. 7, those portions of the circuit comprising the amplifier A, the oscillator O and transducer T are each indicated by a dash line block, while the parts within recorder R are also indicated by a dash line block. A suitable associated power supply (not shown) may be connected to B+ input and ground leads 45 and 46, respectively, across which a condenser 47 may be connected. The oscillator O may include a duo-triode 48, a pentode 49 and a duo-diode 50. The frequency of oscillation may be varied by the choice of different values for a capacitor 51, which may be placed in parallel with a tank coil 52 in B+ input lead 45. The output from one half of duo-triode 48 is transformer coupled through a transformer 53 and lines 54 and 55 directly to opposite ends of the transducer coils by connection to the respective leads 32 and 33. Line 55 is further connected to one end of the slide wire of potentiometer 37, serially through condenser 56, variable resistance 57, resistor 58 and line 59; while line 54 is further connected to the other end of the slide wire of potentiometer 37, serially through condenser 60, having variable condenser 61 in shunt, resistor 62 and line 63. For calibration purposes, resistor 64 and variable resistor 65 are serially connected across lines 59 and 63, in shunt with potentiometer 37. Lead 34, the common connection between coils 30 and 31 of the transducer, is connected to ground potential line 46'.

The slide wire of potentiometer 37 is connected to the input of amplifier A, which comprises two stages of amplification provided by pentode 66 and triode 67, the slide wire of potentiometer 37 being connected to the control grid of pentode 66 via line 68. The anode of pentode 66 is coupled to the grid of triode 67, serially through capacitor 69, while the anode of triode 67 is connected to one side of the primary winding of an output transformer 70, the other side being connected to B+ potential line 45'. Transformer 70 has a split secondary winding, with the resistance of potentiometer 71 connected serially therebetween. The output of the first half of duo-triode 48 is transformer coupled through a transformer 72 via a split secondary connected in parallel and having one end connected to ground potential line 46' by a wire 73 and the other end connected to the sliding top of the potentiometer 71 by a wire 74, serially through resistor 75 to effect electrical balance in the amplifier output. One end of the secondary of output transformer 70 is connected by a wire 76 serially through a rectifier network of diode 77 with resistor 78 in shunt, and a wire 79 connected to one input terminal of a chopper connection block 80 of recorder R, while the other end of the secondary of output transformer 70 is connected by a wire 81 serially through a rectifier network of diode 82 with resistor 83 in shunt and a wire 84 to the other input of the chopper connection block 80 of recorder R. The rectifier network includes filters in the form of condenser 85 and resistor 86 connected in parallel between the cathode of diode 77 and ground potential line 46', with condenser 87 and resistor 88 connected in parallel between the cathode of diode 82 and ground potential line 46'.

The remainder of the parts shown in the circuit of oscillator O includes a by-pass condenser 90 in the central grid circuit of pentode 49, also connected to the first half anode of duo-diode 50 by a wire 91, which is connected to ground potential line 46' through resistor 92. Voltage divider resistors 93 and 94 are connected with the suppressor grid of pentode 49, while resistor 95 is a plate load resistor for the first half of dual triode 48. A coupling condenser 96 is connected between the anode of pentode 49 and the grid of dual triode 48, while voltage divider resistors 97 and 98, in series with resistor 99, establish bias on the cathodes of duo-diodes 50. Resistor 100 and condenser 101 are connected serially between the cathodes of duo-diode 50 and the primary of transformer 72. The control grid of duo-triode 48 is connected to the second half anode of duo-diode 50 by a wire 102, serially through resistor 103, and to ground potential line 46', serially through resistor 104, with a filter to ground through condenser 105. The anode of the first half of duo-triode 48 is connected to B+ potential line 45' through half of the primary winding of transformer 72, while the anode of the second half is connected to line 45' through the primary winding of transformer 53. Each of the tubes 48, 49 and 50 may be provided with heaters in a conventional manner.

The remainder of the parts shown in the circuit of amplifier A include an isolation condenser 110 in a voltage supply for the pentode 66, resistors 111 and 112 acting as a plate load therefor and as a voltage divider for the screen grid thereof. The screen grid circuit of pentode 66 also includes an isolation resistor 113 and a by-pass condenser 114, while the suppressor grid and cathode are connected together and to ground potential line 46' through a bias resistor 115, by passed by condenser 116. The central grid of pentode 66 is also connected to ground potential through resistor 117. The control grid of triode 67 is biased to ground potential through resistor 120, while the cathode is connected to ground potential through resistor 121, which is by-passed by condenser 122. The anode of triode 67 is connected to B+ potential line 45' through the primary winding of transformer 70, which acts as the plate load, while a resistor 123, connected between line 74 to potentiometer 71 and ground potential line 46', acts to smooth out oscillations.

The amplifier A and oscillator O may be installed in a separate housing, or in the recorder housing, although the condensers 56, 60 and 61, resistors 57, 58, 62, 64 and 117, and particularly variable resistors 57 and 65, may be installed in the recorder cabinet, so that the latter may be readily adjusted, as by knobs 130 and 131, respectively, of FIG. 1.

In the operation of the balance, an unknown weight 19 may be placed on pan 15 of FIG. 2 and a standard weight 18 approximating the weight of the unknown placed on the other pan 14, although the placement of the unknown and standard may be reversed, as indicated previously and as shown in FIG. 1. As the beam balance is deflected, probe 22 will be moved a greater distance into one of the transducer coils 30 or 31 and out of the other coil, changing the inductance of the respective coils. An unbalance is thus created in the bridge circuit, causing a potential difference to appear at the output thereof. The ouput from the bridge is amplified and the amplified output is rectified, while the rectified output is applied to the chopper input of the recorder and energizes servomotor 38 of FIG. 6, which moves the slide wire of potentiometer 37 in a direction to balance the bridge circuit. Since pen 40 is coupled to the slide wire and servo motor, it will produce the trace 43 on chart 41, representative of the movement of the slide wire necessary to produce a balance in the bridge circuit. When chart 41 is moved at a constant speed by rollers 42 and 42', trace 43 will be recorded as a function of time.

Automatically switched weights are suspended by the weight switching mechanism W of FIG. 1 and are operated by cams and a motor under the balance floor (not shown because conventional). Whenever pen 43 approaches either edge of chart 41, the weights are automatically added or subtracted, as required, in predetermined increments. This addition or removal of weights causes the pen to move to the other end of the range, as represented by the opposite edge of the chart.

In a particular balance embodying the invention, a recorder chart eleven inches wide is calibrated to cover the range from −5 mg. to +105 mg., and can be read in increments of $\frac{1}{10}$ mg. The automatically switched weights are added or subtracted in 100 milligram increments. The switch weights total 4 grams, which is equivalent to 40 chart-widths; and each weight or combination of weights is accurate within $\frac{1}{1000}$ of the chart width. With the use of manually applied weights, the capacity of the balance may be increased to 200 grams.

The automatic recording balance of this invention combines the range and accuracy of an analytical balance with a continuous record and automatic operation. The operation of the balance is simple. The controls are essentially the usual beam and pan release on the balance and an on-off switch for the recorder. The zero point and sensitivity are normally adjusted on the balance. There is an electrical fine adjustment for zero point by variable resistor 57 and for sensitivity by variable resistor 65, and each may be operated by a knob on the front of the recorder cabinet. The operating voltage for the transducer T need be only a few volts, such as from 0.3 volt to 5 volts and conveniently about 3 volts, while the frequency may be on the order of 3 to 15 kilocycles, such as between 6 and 10 kilocycles.

When making a set-up, it is not necessary to counterbalance the unknown exactly with weights or tares. Within the range of the switch weights, the recording balance will automatically add or subtract weights as required to balance the beam to the nearest 100 mg., and the recorder will chart the value within the 100 mg. range. This line on the chart can be taken as the zero point in most cases.

Although in the embodiments above-described the invention is applied to a beam balance, it will be understood that the invention may also be applied to other types of balances. Also, while a preferred embodiment of this invention and certain variations have been described, it will be evident that other embodiments may exist and that various changes and modifications may be made therein, without departing from the spirit and scope of this invention.

What is claimed is:
1. A balance, including the combination of a movable portion of said balance responsive to weight differences; a stationary portion of said balance; a signal producing circuit; oscillator means for energizing said circuit and connected across said circuit; an inductance sensitive transducer coil means mounted on the stationary portion of said balance, connected in said circuit and including a variable permeance pair of coils; and a probe mounted on the movable portion of said balance and positioned for axial movement within said transducer coils for varying the inductance of said transducer coils as the movable weight responsive portion of the balance is deflected, to produce an output signal of said circuit proportional to the magnitude and direction of the deflection of said movable portion of the balance.

2. A balance, as set forth in claim 1, wherein said transducer coil means is mounted about a substantially vertical axis; and said inductance varying means comprises a probe mounted for substantially vertical movement within said transducer coil means.

3. A balance, as set forth in claim 1, wherein said transducer coil means is mounted about a substantially horizontal axis, and said inductance varying means comprises a probe mounted for substantially horizontal movement within said transducer coil means.

4. A balance, as set forth in claim 1, wherein said transducer coil means is mounted about a substantially vertical axis; said inductance varying means comprises a probe mounted for vertical movement within said transducer coil means; and including a bearing for suspending said probe and maintaining said probe in a vertical position.

5. A balance system comprising a balance having a stationary portion and a movable portion responsive to weight differences; an inductance sensitive transducer coil means mounted on the stationary portion of said balance and including a variable permeance pair of coils; a bridge circuit including said transducer coils; a probe mounted on the movable portion of said balance and extending into said coils for varying the inductance of said transducer coils as the movable weight responsive portion of the balance is deflected to produce an output signal from the bridge proportional to the magnitude of the deflection of the movable portion of the balance; oscillator means for energizing the bridge circuit and connected across said bridge circuit; amplifier means for amplifying the bridge output; and means responsive to the amplified output to rebalance the bridge.

6. A balance system as defined in claim 5, including recording means responsive to said bridge rebalancing means for providing a record of the unbalance as a function of the magnitude and direction of deflection of the movable portion of said balance.

7. A balance, as set forth in claim 1, wherein said transducer coils are connected by a common lead.

8. A balance, as set forth in claim 7, including means for supplying current to said transducer coils having a frequency on the order of 3 to 15 kilocycles.

References Cited in the file of this patent
UNITED STATES PATENTS

| | | |
|---|---|---|
| 1,851,703 | Hamilton | Mar. 29, 1932 |
| 2,050,629 | Quereau et al. | Aug. 11, 1936 |
| 2,371,040 | Fisher | Mar. 6, 1945 |
| 2,598,812 | Marco | June 3, 1952 |
| 2,683,030 | Caule | July 6, 1954 |
| 2,709,076 | Hausen | May 24, 1955 |
| 2,832,535 | Sherman | Apr. 29, 1958 |
| 2,880,985 | Roberts | Apr. 7, 1959 |
| 2,930,227 | Spademan | Mar. 29, 1960 |
| 2,940,747 | Eder et al. | June 14, 1960 |

OTHER REFERENCES

V. Popov, Serial No. 386,957 (A.P.C.) May 25, 1943.

Electrical Manufacturing, pages 166 and 168, October 1953.

Instruments and Automation, vol. 28, "Analytical Balance Plus Differential Transformer Plus Recording Millivoltmeter Equals Recording Microbalance, pages 1104–1106, July 1955, by Dr. Axel Peterson.

Analytical Chemistry, vol. 29, pages 1206–1210, August 1957.

Review of Scientific Instruments, pages 1135–1138, December 1958.